United States Patent
Patil et al.

(10) Patent No.: US 11,816,365 B2
(45) Date of Patent: Nov. 14, 2023

(54) STORAGE VOLUME CREATION USING PERFORMANCE VOLUMES AND CAPACITY VOLUMES

(71) Applicant: Dell Products L.P., Round Rock, TX (US)

(72) Inventors: Manish Patil, Bangalore (IN); Sanjay Kumar Tiwari, Bangalore (IN)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 17/580,938

(22) Filed: Jan. 21, 2022

(65) Prior Publication Data

US 2023/0236768 A1    Jul. 27, 2023

(51) Int. Cl.
*G06F 3/06*    (2006.01)

(52) U.S. Cl.
CPC .......... *G06F 3/0664* (2013.01); *G06F 3/0611* (2013.01); *G06F 3/0613* (2013.01); *G06F 3/0659* (2013.01); *G06F 3/0683* (2013.01)

(58) Field of Classification Search
CPC .... G06F 3/0664; G06F 3/0611; G06F 3/0613; G06F 3/0659; G06F 3/0683; G06F 11/1461
See application file for complete search history.

(56) References Cited

U.S. PATENT DOCUMENTS

| | | |
|---|---|---|
| 9,274,941 B1 | 3/2016 | Throop et al. |
| 9,778,852 B1 | 10/2017 | Marshak et al. |
| 10,481,820 B1 | 11/2019 | Dunbar |
| 2022/0245034 A1* | 8/2022 | Nara ............ G06F 11/1461 |

* cited by examiner

*Primary Examiner* — Ernest Unelus
(74) *Attorney, Agent, or Firm* — Ryan, Mason & Lewis, LLP (57) ABSTRACT

Methods, apparatus, and processor-readable storage media are provided herein for storage volume creation using performance volumes and capacity volumes. An example computer-implemented method includes configuring a storage system with at least first and second storage tiers each comprising a plurality of storage devices; creating a virtual storage volume having a first portion corresponding to at least a portion of the plurality of storage devices of the first storage tier and a second portion corresponding to at least a portion of the plurality of storage devices of the second storage tier; and processing input-output requests from one or more host devices associated with the virtual storage volume, wherein the processing comprises moving data between the first portion and the second portion of the virtual storage volume so that each of the input-output requests is processed using the first portion of the virtual storage volume.

20 Claims, 7 Drawing Sheets

FIG. 7

STORAGE VOLUME CREATION USING PERFORMANCE VOLUMES AND CAPACITY VOLUMES

FIELD

The field relates generally to information processing systems, and more particularly to storage in such information processing systems.

BACKGROUND

Storage systems are often configured to include multiple storage tiers, with different storage tiers providing different levels of input-output performance, throughput, latency and/or other characteristics. In such systems, data may be moved from one storage tier to another storage tier within a given storage system based on access frequency of the data or other factors. However, existing storage tiering arrangements may not efficiently utilize the higher performing tiers, which can lead to increased costs and/or limit storage performance.

SUMMARY

Illustrative embodiments provide techniques for storage volume creation using performance volumes and capacity volumes. An exemplary computer-implemented method includes configuring a storage system with at least first and second storage tiers each comprising a plurality of storage devices; creating a virtual storage volume having a first portion corresponding to at least a portion of the plurality of storage devices of the first storage tier and a second portion corresponding to at least a portion of the plurality of storage devices of the second storage tier; and processing input-output requests from one or more host devices associated with the virtual storage volume, wherein the processing comprises moving data between the first portion and the second portion of the virtual storage volume so that each of the input-output requests is processed using the first portion of the virtual storage volume.

Illustrative embodiments can provide significant advantages relative to conventional storage tiering techniques. For example, such embodiments can significantly improve the efficiency of a multi-tier storage system by creating a virtual storage volume that delivers the storage performance of a performance tier with the storage capacity benefits of a capacity tier.

These and other illustrative embodiments described herein include, without limitation, methods, apparatus, systems, and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
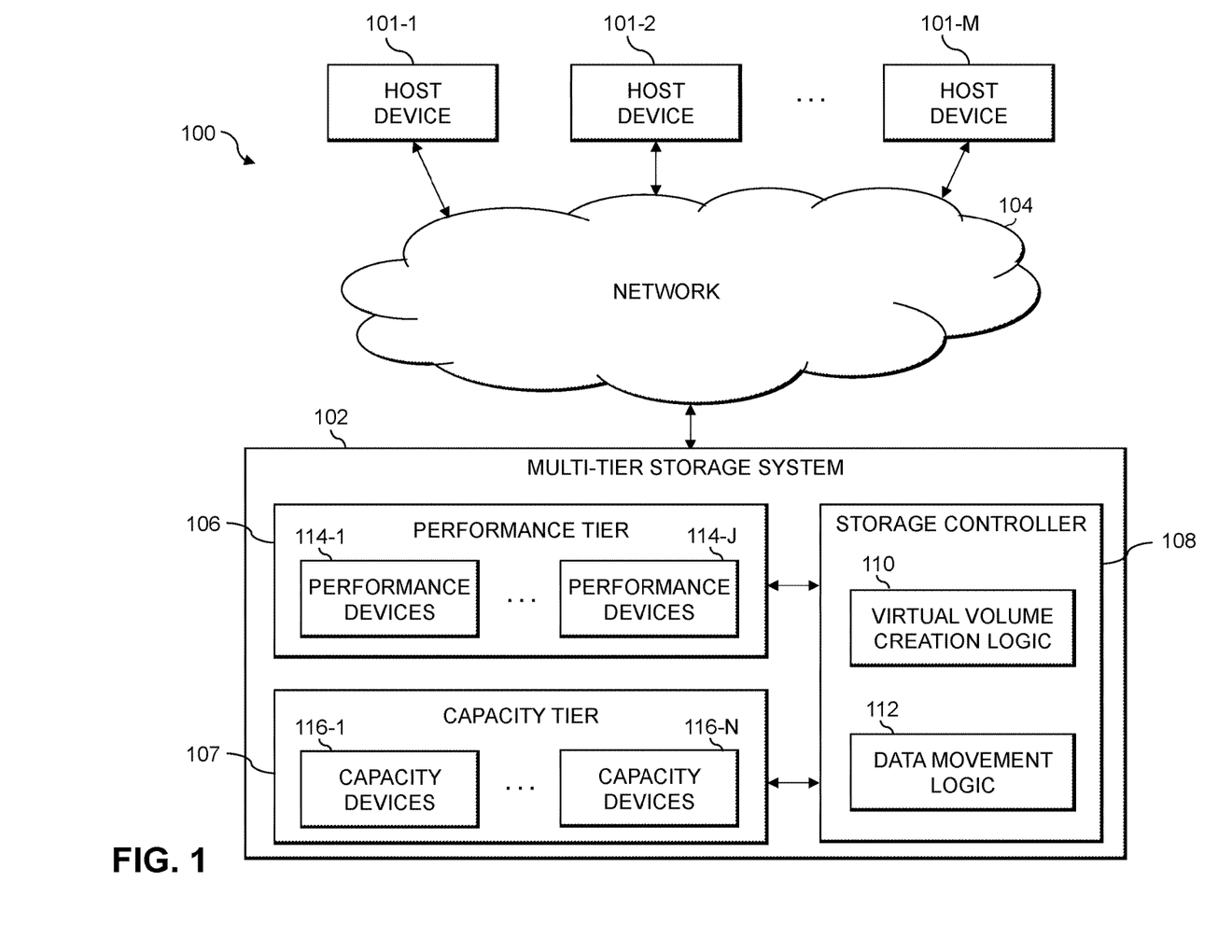
FIG. 1 shows an information processing system configured for storage volume creation using performance volumes and capacity volumes in an illustrative embodiment.

FIG. 1 shows an information processing system 100 configured in accordance with an illustrative embodiment. The information processing system 100 comprises a plurality of host devices 101-1, 101-2, . . . 101-M, collectively referred to herein as host devices 101. The host devices 101 are configured to communicate with a multi-tier storage system 102 over a network 104.

The host devices 101 illustratively comprise servers or other types of computers of an enterprise computer system, cloud-based computer system or other arrangement of multiple compute nodes associated with respective users.

For example, the host devices 101 in some embodiments illustratively provide compute services such as execution of one or more applications on behalf of each of one or more users associated with respective ones of the host devices. Such applications illustratively generate input-output (IO) operations that are processed by the multi-tier storage system 102. The term "input-output" as used herein refers to at least one of input and output. For example, IO operations may comprise write requests and/or read requests directed to logical addresses of a particular logical storage volume of the multi-tier storage system 102. These and other types of IO operations are also generally referred to herein as IO requests.

The multi-tier storage system 102 illustratively comprises processing devices of one or more processing platforms. For example, the multi-tier storage system 102 can comprise one or more processing devices each having a processor and a memory, possibly implementing virtual machines and/or containers, although numerous other configurations are possible.

The multi-tier storage system 102 can additionally or alternatively be part of a cloud infrastructure such as an Amazon Web Services (AWS) system. Other examples of cloud-based systems that can be used to provide at least portions of multi-tier storage system 102 include Google Cloud Platform (GCP) and Microsoft Azure.

The multi-tier storage system 102 comprises a performance tier 106, a capacity tier 107, and a storage controller 108. The performance tier 106 is an example of what is more generally referred to herein as a "front-end storage tier" or still more generally a "first storage tier" of the multi-tier storage system 102. The capacity tier 107 is an example of what is more generally referred to herein as a "back-end storage tier" or still more generally a "second storage tier" of the multi-tier storage system 102. Other types and arrangements of two or more storage tiers can be used in other embodiments. Each of the performance tier 106 and the capacity tier 107 is assumed to comprise a plurality of storage devices.

Generally, the storage devices store data of a plurality of storage volumes. For example, the storage volumes may illustratively comprise respective logical units (LUNs) or other types of logical storage volumes.

More specifically, the storage devices of the performance tier 106 comprise performance devices 114-1, . . . 114-J (collectively performance devices 114), which, in some embodiments, can include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used.

The storage devices of the capacity tier 107, in at least some embodiments, comprise capacity devices 116-1, . . . 116-N (collectively capacity devices 116). The capacity devices 116 include, for example, hard disk drives (HDDs). Additional or alternative types of storage devices that may be implemented in at least a portion of the capacity tier 107 include solid state drive (SSD) devices as well as other types of disk-based or electronic memory. For example, HDDs can be used in combination with or in place of SSDs or other types of storage devices in the multi-tier storage system 102.

It is therefore to be appreciated that numerous different types of storage devices can be used in the multi-tier storage system 102. For example, each of the performance tier 106 and the capacity tier 107 of the multi-tier storage system 102 can include a plurality of storage devices with different types of storage devices being used in different ones of the storage tiers. For example, the performance devices 114 of the performance tier 106 may comprise flash drives while the capacity devices 116 of the capacity tier 107 may comprise HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the multi-tier storage system 102 illustratively comprises a scale-out all-flash distributed content addressable storage (CAS) system, such as an all-flash storage array from Dell Technologies. A wide variety of distributed or non-distributed storage arrays can be used in implementing the multi-tier storage system 102 in at least some embodiments, including by way of example one or more Unity™ or PowerMax™ storage arrays, commercially available from Dell Technologies. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as NAS, storage area networks (SANs), direct-attached storage (DAS) and distributed DAS, as well as combinations of these and other storage types, including software-defined storage.

In some embodiments, communications between the host devices 101 and the multi-tier storage system 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the multi-tier storage system 102 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The host devices 101 and the multi-tier storage system 102 may be implemented on a common processing platform, or on separate processing platforms. The host devices 101 are illustratively configured to write data to and read data from the multi-tier storage system 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 101 are configured to interact over the network 104 with the multi-tier storage system 102. Such interaction illustratively includes generating IO operations, such as write and read requests, and sending such requests over the network 104 for processing by the multi-tier storage system 102. In some embodiments, each of the host devices 101 comprises a multi-path IO (MPIO) driver configured to control delivery of IO operations from the host device to the multi-tier storage system 102 over selected ones of a plurality of paths through the network 104. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the multi-tier storage system 102.

The MPIO driver may comprise, for example, an otherwise conventional MPIO driver, such as a PowerPath® driver from Dell Technologies, suitably modified in the manner disclosed herein to provide functionality for storage volume creation using performance volumes and capacity volumes. Other types of MPIO drivers from other driver vendors may be suitably modified to incorporate functionality for storage volume creation using performance volumes and capacity volumes as disclosed herein.

The storage controller 108 of the multi-tier storage system 102 in the FIG. 1 embodiment includes virtual volume creation logic 110 and data movement logic 112. Functionality for creating storage volumes using performance volumes and capacity volumes is illustratively performed at least in part by the storage controller 108, utilizing its virtual volume creation logic 110 and data movement logic 112, in a manner to be described in more detail elsewhere herein. It is to be appreciated that in some embodiments the virtual volume creation logic 110 and/or data movement logic 112 may be implemented separately from the storage controller 108 (e.g., in a separate module of the multi-tier storage system 102).

The storage controller 108 and the multi-tier storage system 102 may further include one or more additional modules and other components typically found in conventional implementations of storage controllers and storage systems, although such additional modules and other components are omitted from the figure for clarity and simplicity of illustration.

In some embodiments, the multi-tier storage system 102 is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the multi-tier storage system 102 in such an embodiment collectively comprise at least a portion of the storage controller 108 of multi-tier storage system 102. For example, in some embodiments the sets of processing modules of the storage nodes collectively comprise a distributed storage controller of the distributed the multi-tier storage system 102. A "distributed storage system" as that term is broadly used herein is intended to encompass any storage system that is distributed across multiple storage nodes.

It is assumed in some embodiments that the processing modules of a distributed implementation of storage controller 108 are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of a distributed storage controller illustratively comprise control modules, data modules, routing modules and at least one management module. Again, these and possibly other modules of a distributed storage controller are interconnected in the full mesh network, such that each of the modules can communicate with each of the other modules, although other types of networks and different module interconnection arrangements can be used in other embodiments.

The management module of the distributed storage controller in this embodiment may more particularly comprise a system-wide management module. Other embodiments can include multiple instances of the management module implemented on different ones of the storage nodes. It is therefore assumed that the distributed storage controller comprises one or more management modules.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

Communication links may be established between the various processing modules of the distributed storage controller using well-known communication protocols such as TCP/IP and remote direct memory access (RDMA). For example, respective sets of IP links used in data transfer and corresponding messaging could be associated with respective different ones of the routing modules.

Each storage node of a distributed implementation of the multi-tier storage system 102 illustratively comprises a CPU or other type of processor, a memory, a network interface card (NIC) or other type of network interface, and a subset of the storage devices, possibly arranged as part of a disk array enclosure (DAE) of the storage node. These and other references to "disks" herein are intended to refer generally to storage devices, including SSDs, and should therefore not be viewed as limited to spinning magnetic media.

The multi-tier storage system 102 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the host devices 101 may be implemented in whole or in part on the same processing platform as the multi-tier storage system 102, or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 101 and the multi-tier storage system 102 to reside in different data centers. Numerous other distributed implementations of the host devices 101 and multi-tier storage system 102 are possible.

Additional examples of processing platforms utilized to implement host devices 101 and the multi-tier storage system 102 in illustrative embodiments will be described in more detail below in conjunction with FIGS. 6 and 7.

It is to be appreciated that these and other features of illustrative embodiments are presented by way of example only, and should not be construed as limiting in any way.

Accordingly, different numbers, types and arrangements of system components such as host devices 101, multi-tier storage system 102, storage controller 108, and network 104 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

An exemplary process utilizing virtual volume creation logic 110 and data movement logic 112 will be described in more detail with reference to the flow diagrams of FIGS. 3-5.

Applications and users often require certain levels of performance from storage devices; however, costs associated with the storage devices can vary depending on the type of storage medium. Generally, for a given amount of storage, faster storage mediums are more expensive. Storage systems often utilize different types of storage mediums in order to gain the speed advantages typically associated with the more expensive types of storage mediums while using the cheaper types of storage mediums to add storage capacity. With the advancements into universal backplanes, storage systems frequently can support more than one storage protocol, thus enabling a heterogeneous mix of storage devices.

One or more embodiments described herein create a virtual storage volume that efficiently utilizes multiple tiers of storage devices. Such embodiments allow a user to obtain the performance benefits of a performance storage tier (e.g., comprised of NVMe storage devices) along with the storage space benefits of a capacity tier (e.g., comprised of HDDs and SSDs). The virtual storage volume is created using a combination of storage devices on the performance tier and the capacity tier. Such a virtual storage volume is generally referred to herein as a mixed volume. In some embodiments, at least one volume created from among the performance tier devices (referred to herein as a performance volume) is exposed to applications for IO operations, and at least one volume created from among the capacity tier devices (referred to herein as a capacity volume) operates in the background to provide storage.

Figure 2:
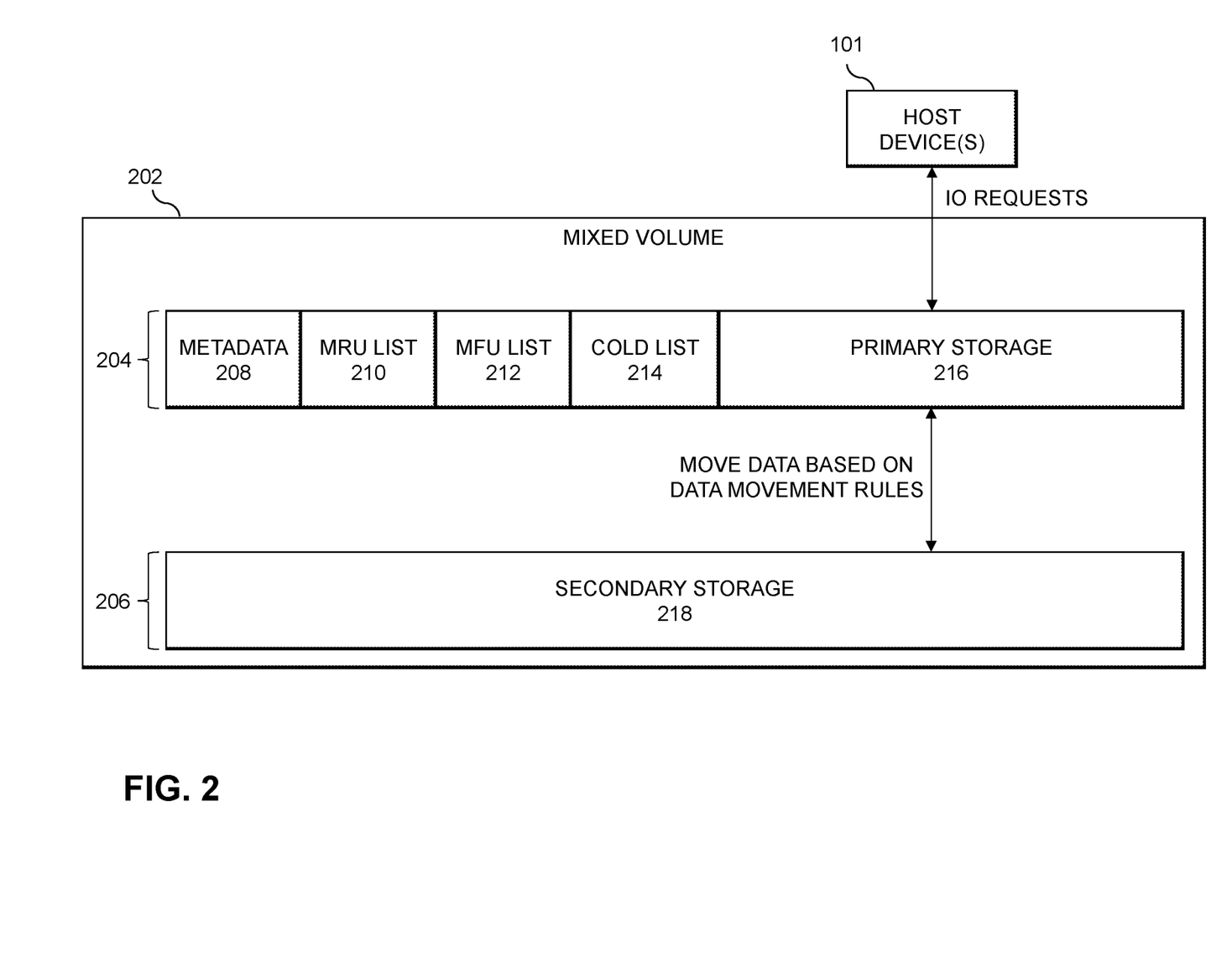
FIG. 2 shows an example of a mixed volume in an illustrative embodiment.

Referring now to FIG. 2, this figure shows an example of a mixed volume in an illustrative embodiment. FIG. 2 depicts one or more host devices 101 and a mixed volume 202, which is assumed to be created using virtual volume creation logic 110. A first portion 204 of the mixed volume 202 is assumed to be created with one or more of the performance devices 114, and a second portion 206 of the mixed volume 202 is assumed to be created using one or more of the capacity devices 116.

In this example, the first portion 204 of the mixed volume 202 includes metadata 208, an MRU (most recently used) list 210, an MFU (most frequently used) list 212, a cold list 214, and primary storage 216; and the second portion 206 includes secondary storage 218. Generally, the metadata 208 includes characteristics of the primary storage 216, such as the RAID configuration, redundancy information, or capacity information. In at least some examples, a redundant copy (not shown in FIG. 2) of the metadata 208 is stored on the first portion 204.

According to one or more embodiments, properties of the second portion 206 of the mixed volume 202 are advertised to the host devices 101, but IO requests from the host devices 101 are directed to the first portion 204. Accordingly, "hot" data corresponding to a given one of the host devices 101 can be maintained in the primary storage 216. Data on the primary storage 216, in some embodiments, is moved to the secondary storage 218 when it becomes colder in order to make more space on the primary storage 216 for new IO operations from the host devices 101. It is to be appreciated that the MRU list 210 and the MFU list 212 can be maintained using respective MRU and MFU algorithms, for example. Each of the lists 210 and 212 can include metadata (including pointers) for data stored in the primary storage 216 and can be used to determine the relative temperature of the data (e.g., whether data is hotter or colder relative to other data in the primary storage 216).

The cold list 214 includes metadata, including pointers, to data that has been moved from the primary storage 216 to the secondary storage 218. Generally, the cold list 214 can be used to enable faster data retrievals from the secondary storage 218.

One or more embodiments include moving data between the first portion 204 and the second portion 206 of the mixed volume 202 based on one or more data movement conditions (sometimes referred to herein as data movement rules). For example, the data movement conditions for moving data from the first portion 204 the second portion 206 can include at least one of:

Moving data when the primary storage 216 is reaching a maximum capacity (e.g., according to a threshold capacity level, such as 80% of maximum capacity);

Moving one or more portions of "cold" data in the primary storage 216 (e.g., data can be considered cold when it is moved out of the MRU list 210 and/or the MFU list 212).

Moving one or more portions of data when there is limited or no IO activity on the primary storage 216 for a certain period of time (e.g., four hours of inactivity).

Moving data according to one or more schedules or events, which can be specified by a user, for example (e.g., a maintenance window or low utilization periods).

Also, the data movement conditions for moving data from the second portion 206 to the primary storage 216 of the first portion 204 of the mixed volume 202 can include at least one of:

Read misses: For example, when a read IO is not found in the primary storage 216, the lists 210, 212, 214 can be searched. When the data is found, it is loaded from the secondary storage 218 to the primary storage 216.

Write misses: For example, when a write IO is not found in the primary storage 216, the cold list 214 is searched to locate the corresponding data in the secondary storage 218. When the data is found, the cold data is written, and a response is sent to the user. In such an example, the data is loaded into the primary storage 216 and the MRU list 210 can be updated.

Sequential write or read operations: For large sequential read or write operations, the primary storage 216 can prefetch the next range of data from the secondary storage 218 and load the data into the primary storage 216. In this context, the term large can be based on a specified threshold, for example.

In some embodiments, the data movement logic 112 moves data between the primary storage 216 and secondary storage 218 based on the lists 210, 212, and 214 and the data movement conditions.

Figure 3:
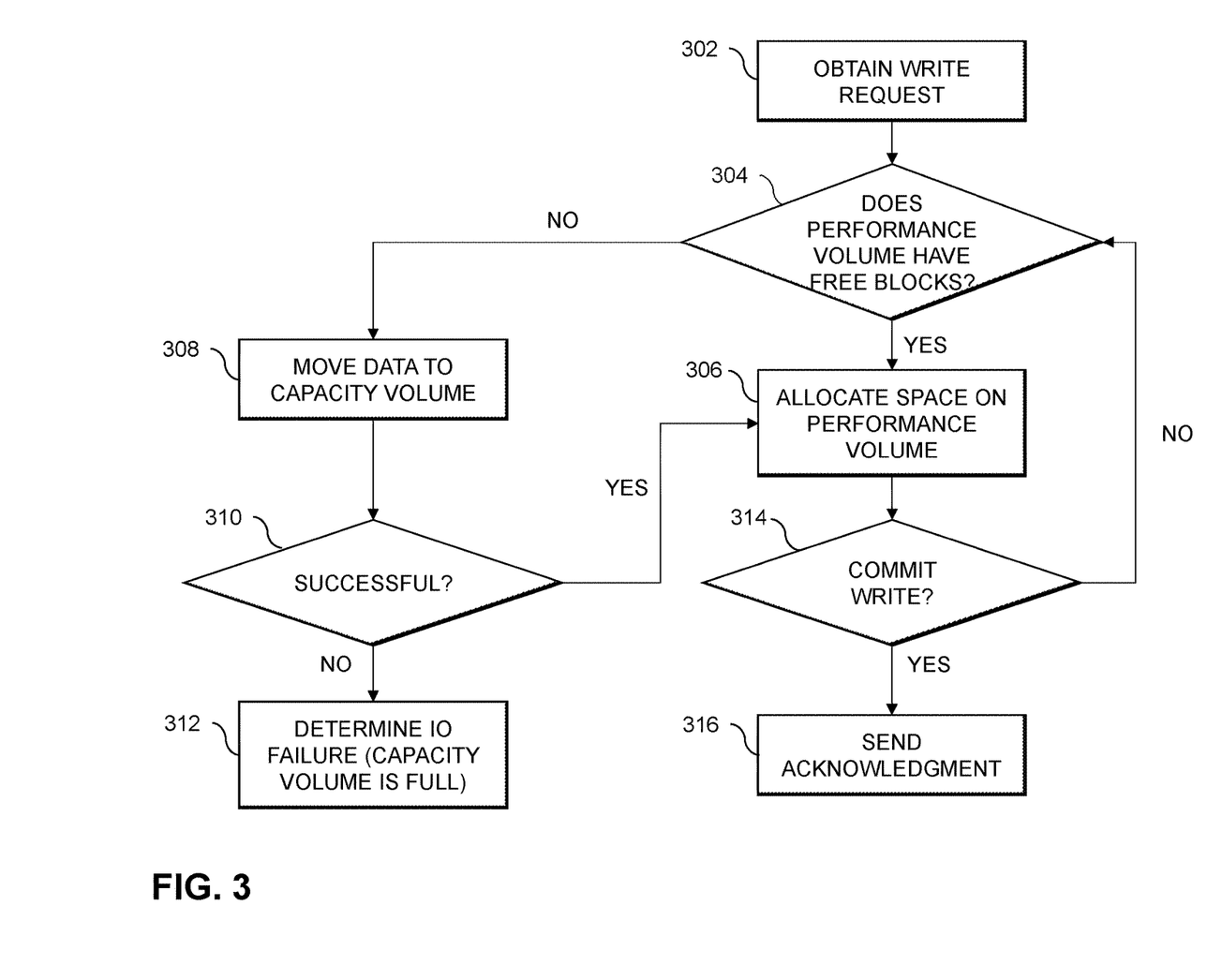
FIG. 3 shows a process flow diagram for a write request in an illustrative embodiment.

Referring also to FIG. 3, this figure shows a process flow diagram for a write request in an illustrative embodiment. Step 302 includes obtaining a write request (e.g., associated with one of the host devices 101). Step 304 checks whether a performance volume (e.g., corresponding to primary storage 216) has free blocks available for the write request. If yes, then the process continues to step 306, otherwise the process continues to step 308. Step 308 includes moving data to the capacity volume (e.g., corresponding to secondary storage 218). As an example, step 308 includes moving the least recently used (LRU) data or least frequently used (LFU) data from the performance volume to the capacity volume. Step 310 includes a test to check whether the data was moved successfully. If no, then step 312 includes determining that there is an IO failure as the capacity volume is full. Otherwise, the process returns to step 306.

Step 306 includes allocating space on the performance volume for the write request. Step 314 checks whether the write operation is committed to the performance volume. If so, then step 316 includes sending an acknowledgement of the write request. If the result of step 314 is no, then the process returns to step 304.

Figure 4:
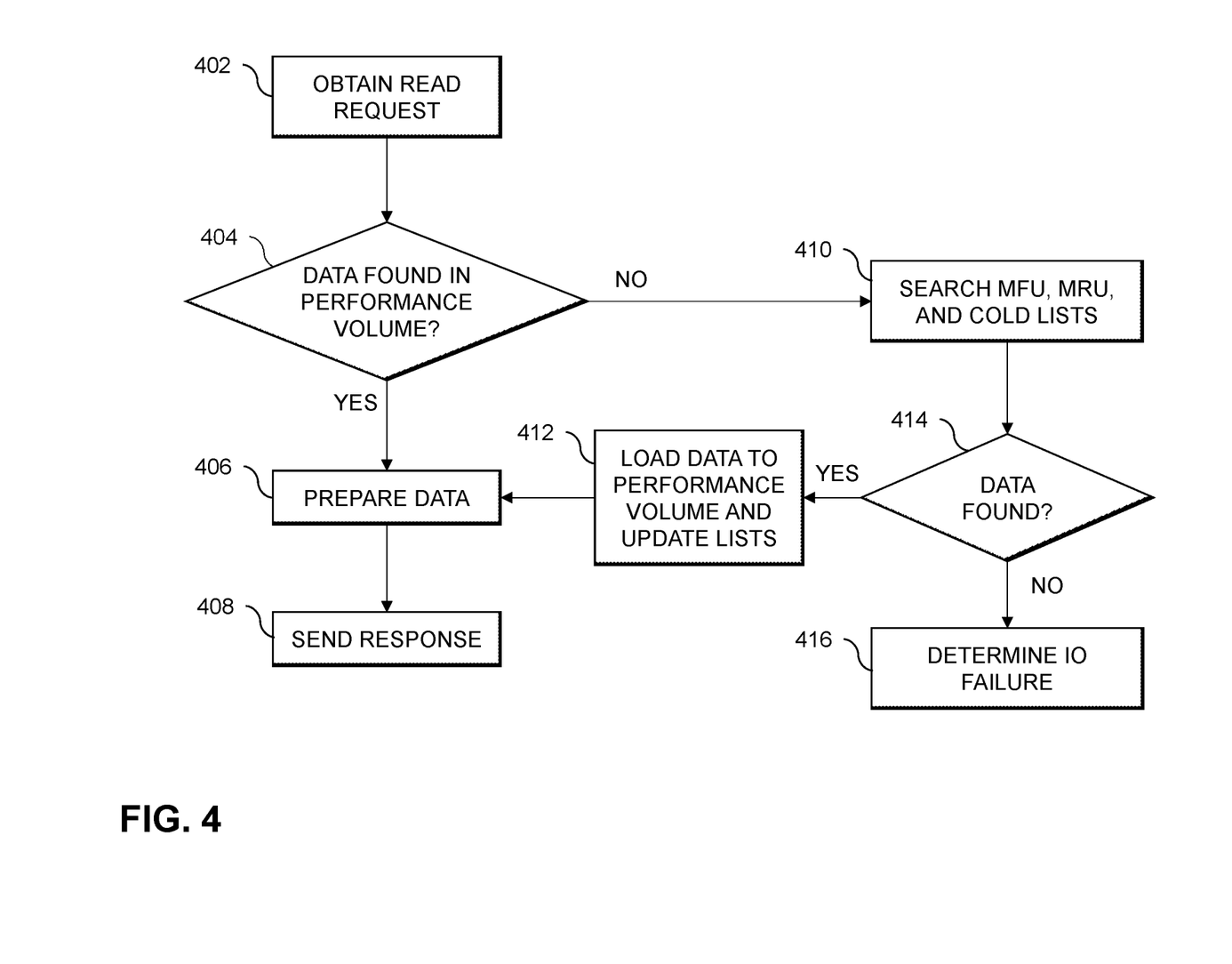
FIG. 4 shows a process flow diagram for a read request in an illustrative embodiment.

FIG. 4 shows a process flow diagram for a read request in an illustrative embodiment. Step 402 includes obtaining a read request (e.g., associated with one of the host devices 101). Step 404 checks whether the data corresponding to the read request can be found on the performance volume (e.g., corresponding to the primary storage 216). If yes, the process continues to step 406, which includes preparing the relevant data for the read request, and step 408 includes sending a response to the read request.

If the data is not found at step 404, then the process continues to step 410. Step 410 includes searching the MFU, MRU, and cold lists (as described above in conjunction with FIG. 2). Step 414 checks whether the data was found. If yes, then step 412 includes loading the data to the performance volume (e.g., corresponding to primary storage 216) and updating the MFU, MRU, and cold lists. The process then returns to step 406.

If the data is not found at step 414, then step 416 includes determining there is an JO failure since the data is not found.

By way of example, assume a user indicates a 500 GB storage volume is needed. In accordance with one or more embodiments, a capacity volume can be created using the capacity tier 107 and a corresponding performance volume can be created using the performance tier 106. A size of the performance volume, in some embodiments, can be based at least in part on the size of the storage volume. For instance, the size of the performance volume can be based on a percentage of the size of the storage volume (e.g., 10% or 50 GB in this example). Also, in at least some embodiments, the performance volume can be implemented using, for example, a RAID1 configuration, and the capacity volume can be implemented using, for example, a RAID5 configuration (although other combinations of two distinct types of RAID configurations may be employed in other embodiments). The capacity volume properties (e.g., size, type, redundancy, block size, sector size, etc.) can be exposed to the host devices 101, while keeping the properties of the performance drive hidden from the host devices 101.

Accordingly, the host devices can perform IO operations to the capacity volume, but the IO operations processed using the performance volume (e.g., the IO operations are routed to, and responses are received from, the performance volume), while being transparent to the application. The data from the performance volume is moved to the capacity volume according to the data movement conditions, as described in more detail elsewhere herein. Such embodiments allow the host devices 101 to have the speed benefits associated with the performance volume, while only taking up a fraction of the total space from the performance tier 106. This configuration, in such embodiments, also enables capacity expansion, RAID rebuilds, drive replacements, and maintenance activity to be seamlessly performed on the capacity volume without substantially affecting the overall performance.

Figure 5:
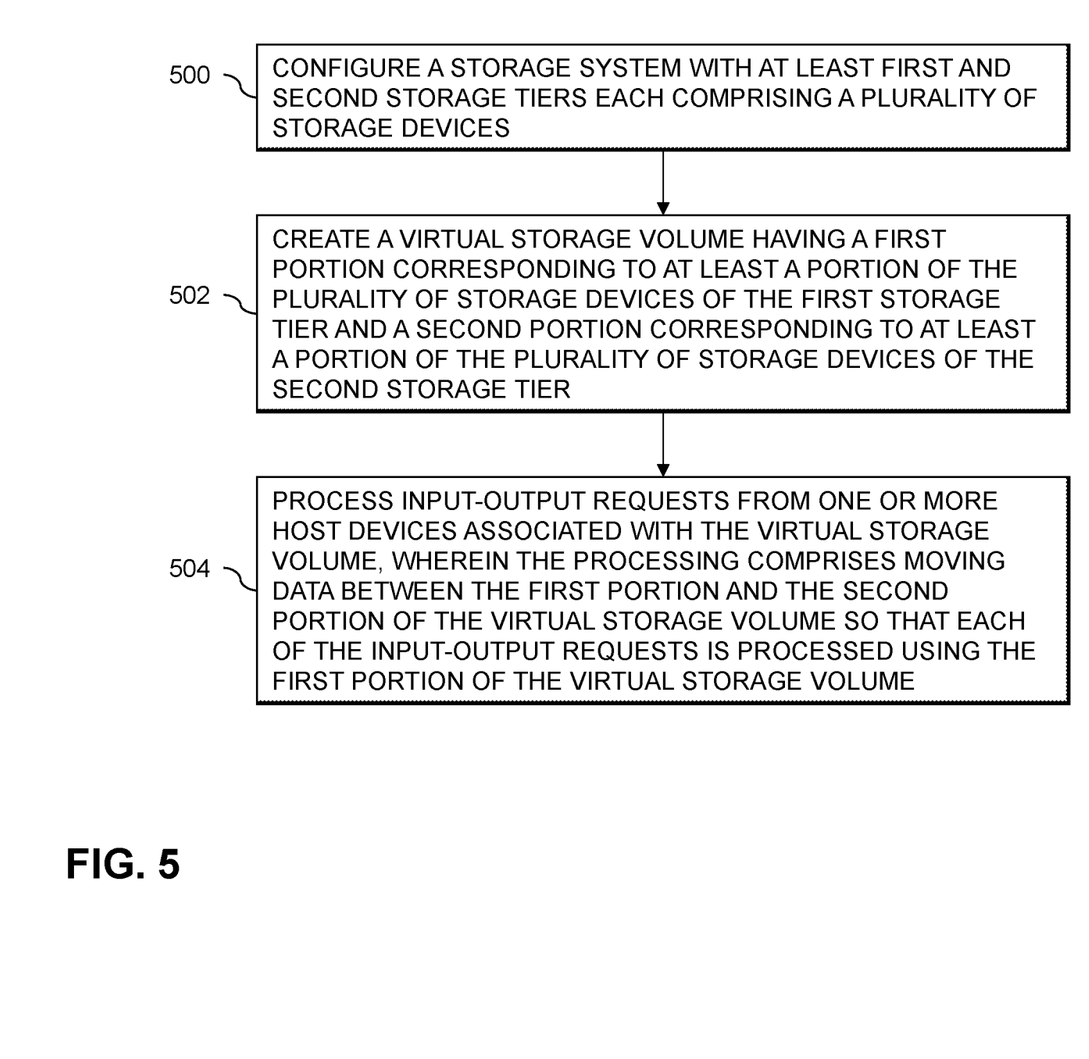
FIG. 5 is a flow diagram of a storage volume creation process using performance volumes and capacity volumes in an illustrative embodiment.

FIG. 5 is a flow diagram of a process for storage volume creation using performance volumes and capacity volumes in an illustrative embodiment. It is to be understood that this particular process is only an example, and additional or alternative processes can be carried out in other embodiments.

In this embodiment, the process includes steps 500 through 504. These steps are assumed to be performed, at least in part by, the multi-tier storage system 102 utilizing its virtual volume creation logic 110 and data movement logic 112.

Step 500 includes configuring a storage system with at least first and second storage tiers each comprising a plurality of storage devices. Step 502 includes creating a virtual storage volume having a first portion corresponding to at least a portion of the plurality of storage devices of the first storage tier and a second portion corresponding to at least a portion of the plurality of storage devices of the second storage tier. Step 504 includes processing input-output requests from one or more host devices associated with the virtual storage volume, wherein the processing comprises moving data between the first portion and the second portion of the virtual storage volume so that each of the input-output requests is processed using the first portion of the virtual storage volume.

The storage devices of the first storage tier may provide at least one of: a higher throughput and a faster response time relative to the storage devices of the second storage tier. The storage devices on the first storage tier may include one or more non-volatile memory express drive devices. The storage devices on the second storage tier may include one or more hard disk drive devices. The processing may include: maintaining, on the first portion of the virtual storage volume, one or more of: (i) a first list comprising pointers to items of data stored on the first portion that are most recently used, (ii) a second list comprising pointers to items of data stored on the first portion that are most frequently used, and (iii) a third list comprising pointers to items of data that have been moved from the first portion to the second portion of the virtual storage volume. A given one of the input-output requests may include a read request, and the processing may include: in response to determining that the first portion of the virtual storage volume does not comprise data associated with the read request, searching at least one of: the first, second, and third lists to identify a location of the requested data; and moving the requested data to the first portion of the virtual storage volume to generate a response to the read request. A given one of the input-output requests may include a write request, and the processing may include: in response to determining that the first portion does not have storage space to process the write request, moving one or more portions of data stored on the first portion of the virtual storage volume to the second portion of the virtual storage volume; and allocating, based at least in part on the moving, storage space on the first portion of the virtual storage volume for the write request. The processing may include: identifying data on the first portion of the virtual storage volume that is at least one of: (i) least recently used and (ii) least frequently used relative to other data on the first portion of the virtual storage volume; and moving the identified data from the first portion to the second portion of the virtual storage volume. The processing may include: identifying that the input-output requests comprise sequential input-output requests; prefetching, from the second portion of the virtual storage volume, one or more portions of data associated with the sequential input-output requests; and loading the prefetched data to the first portion of the virtual storage volume. The processing may include moving data from the first portion to the second portion of the virtual storage volume based on at least one of: a storage capacity threshold associated with the first portion of the storage volume; an input-output activity threshold; and one or more specified schedules. The first portion of the virtual storage volume may be associated with a first RAID configuration of a first type (e.g., a RAID1 configuration); and the second portion of the storage volume may be associated with a second RAID configuration of a second type (e.g., a RAID5 configuration).

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional storage tiering approaches. For example, some embodiments allow a virtual volume to be created using a combination of performance and capacity tiers, which provides faster performance with just a fraction of the cost incurred by a traditional implementation. These and other embodiments can effectively provide users with the speed benefits of a performance storage tier and the capacity benefits of a capacity storage tier.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for storage volume creation using performance volumes and capacity volumes will now be described in greater detail with reference to FIGS. 6 and 7. Although described in the context of system 100, these platforms may also be used to implement at least portions of other information processing systems in other embodiments.

Figure 6:
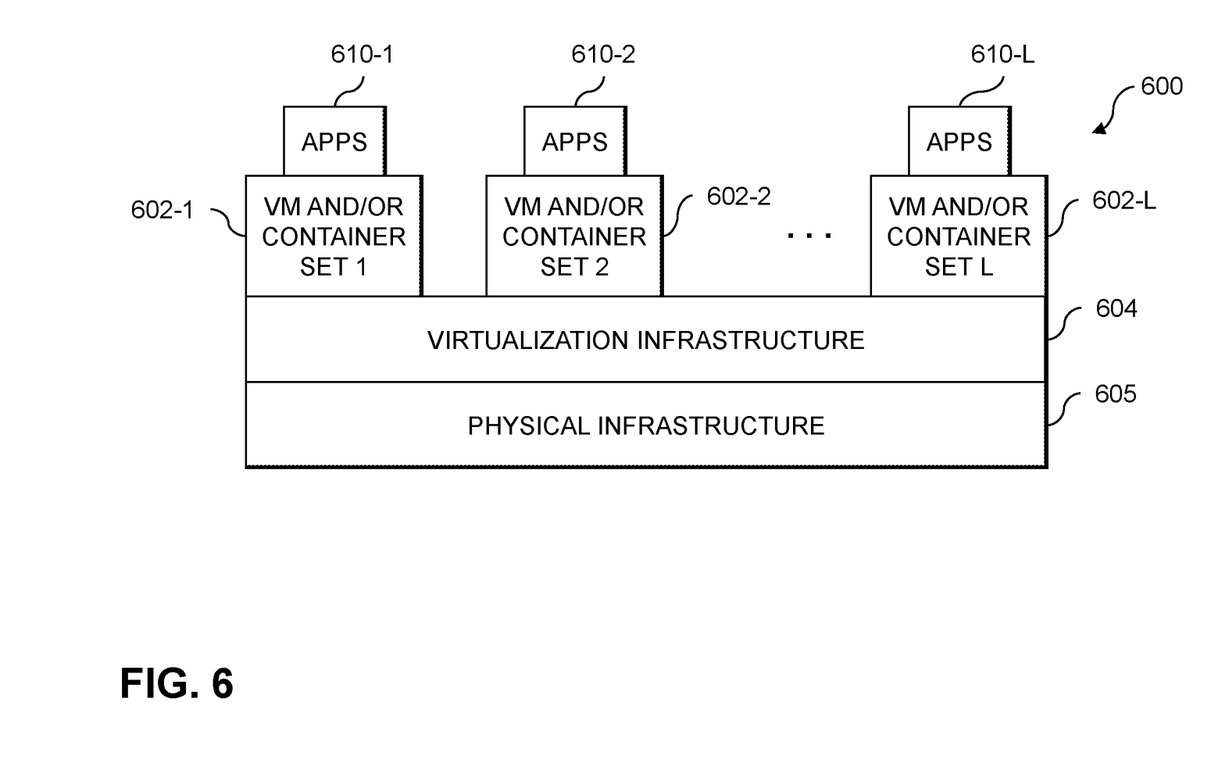
FIGS. 6 and 7 show examples of processing platforms that may be utilized to implement at least a portion of an information processing system in illustrative embodiments.
Figure 7:
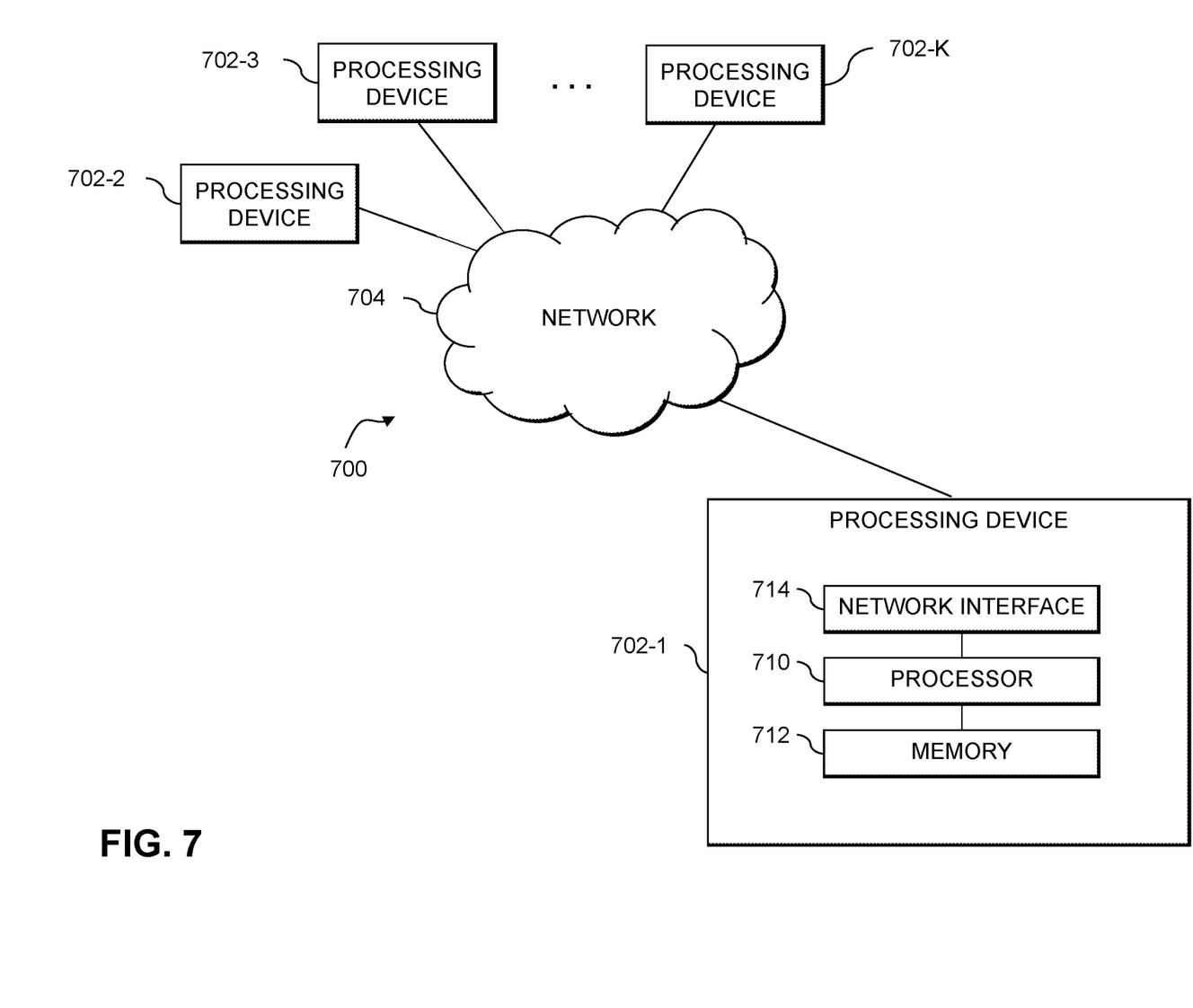

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604. Such a hypervisor platform may comprise an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 712 may comprise RAM, read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise various arrangements of converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for storage volume creation using performance volumes and capacity volumes as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage devices, storage controllers, and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   configuring a storage system with at least first and second storage tiers each comprising a plurality of storage devices;
   creating a virtual storage volume having a first portion corresponding to at least a portion of the plurality of storage devices of the first storage tier and a second portion corresponding to at least a portion of the plurality of storage devices of the second storage tier; and
   processing input-output requests from one or more host devices associated with the virtual storage volume, wherein the processing comprises moving data between the first portion and the second portion of the virtual storage volume, based at least in part on two or more lists related to data movement operations between the first portion and the second portion, so that each of the input-output requests is processed using the first portion of the virtual storage volume, and wherein the two or more lists are maintained on the first portion of the virtual storage volume and comprise a first list comprising pointers to items of data stored on the first portion that are most recently used and a second list comprising pointers to items of data stored on the first portion that are most frequently used;
   wherein the method is performed by at least one processing device comprising a processor coupled to a memory.

2. The computer-implemented method of claim 1, wherein the storage devices of the first storage tier provide at least one of: a higher throughput and a faster response time relative to the storage devices of the second storage tier.

3. The computer-implemented method of claim 2, wherein at least one of:
   the storage devices on the first storage tier comprise one or more non-volatile memory express drive devices, and
   the storage devices on the second storage tier comprise one or more hard disk drive devices.

4. The computer-implemented method of claim 1, wherein the two or more lists further comprise a third list comprising pointers to items of data that have been moved from the first portion to the second portion of the virtual storage volume.

5. The computer-implemented method of claim 4, wherein a given one of the input-output requests comprises a read request, and wherein the processing comprises:
   in response to determining that the first portion of the virtual storage volume does not comprise data associated with the read request, searching at least one of: the first, second, and third lists to identify a location of the data associated with the read request;
   moving the data associated with the read request to the first portion of the virtual storage volume; and
   providing a response to the read request.

6. The computer-implemented method of claim 1, wherein a given one of the input-output requests comprises a write request, and wherein the processing comprises:
   in response to determining that the first portion does not have storage space to process the write request, moving one or more portions of data stored on the first portion of the virtual storage volume to the second portion of the virtual storage volume; and
   allocating, based at least in part on the moving, storage space on the first portion of the virtual storage volume for the write request.

7. The computer-implemented method of claim 1, wherein the processing comprises:
    identifying data on the first portion of the virtual storage volume that is at least one of: (i) least recently used and (ii) least frequently used relative to other data on the first portion of the virtual storage volume; and
    moving the identified data from the first portion to the second portion of the virtual storage volume.

8. The computer-implemented method of claim 1, wherein the processing comprises:
    identifying that the input-output requests comprise sequential input-output requests;
    prefetching, from the second portion of the virtual storage volume, one or more portions of data associated with the sequential input-output requests; and
    loading the prefetched data to the first portion of the virtual storage volume.

9. The computer-implemented method of claim 1, wherein the processing comprises moving data from the first portion to the second portion of the virtual storage volume based on at least one of:
    a storage capacity threshold associated with the first portion of the storage volume;
    an input-output activity threshold; and
    one or more specified schedules.

10. The computer-implemented method of claim 1, wherein at least one of:
    the first portion of the virtual storage volume is associated with a first RAID configuration of a first type; and
    the second portion of the storage volume is associated with a second RAID configuration of a second type.

11. A non-transitory processor-readable storage medium having stored therein program code of one or more software programs, wherein the program code when executed by at least one processing device causes the at least one processing device:
    to configure a storage system with at least first and second storage tiers each comprising a plurality of storage devices;
    to create a virtual storage volume having a first portion corresponding to at least a portion of the plurality of storage devices of the first storage tier and a second portion corresponding to at least a portion of the plurality of storage devices of the second storage tier; and
    to process input-output requests from one or more host devices associated with the virtual storage volume, wherein the processing comprises moving data between the first portion and the second portion of the virtual storage volume, based at least in part on two or more lists related to data movement operations between the first portion and the second portion, so that each of the input-output requests is processed using the first portion of the virtual storage volume, and wherein the two or more lists are maintained on the first portion of the virtual storage volume and comprise a first list comprising pointers to items of data stored on the first portion that are most recently used and a second list comprising pointers to items of data stored on the first portion that are most frequently used.

12. The non-transitory processor-readable storage medium of claim 11, wherein the storage devices of the first storage tier provide at least one of: a higher throughput and a faster response time relative to the storage devices of the second storage tier.

13. The non-transitory processor-readable storage medium of claim 12, wherein at least one of:
    the storage devices on the first storage tier comprise one or more non-volatile memory express drive devices, and
    the storage devices on the second storage tier comprise one or more hard disk drive devices.

14. The non-transitory processor-readable storage medium of claim 11, wherein the two or more lists further comprise a third list comprising pointers to items of data that have been moved from the first portion to the second portion of the virtual storage volume.

15. The non-transitory processor-readable storage medium of claim 14, wherein a given one of the input-output requests comprises a read request, and wherein the processing comprises:
    in response to determining that the first portion of the virtual storage volume does not comprise data associated with the read request, searching at least one of: the first, second, and third lists to identify a location of the data associated with the read request;
    moving the data associated with the read request to the first portion of the virtual storage volume; and
    providing a response to the read request.

16. An apparatus comprising:
    at least one processing device comprising a processor coupled to a memory;
    the at least one processing device being configured:
    to configure a storage system with at least first and second storage tiers each comprising a plurality of storage devices;
    to create a virtual storage volume having a first portion corresponding to at least a portion of the plurality of storage devices of the first storage tier and a second portion corresponding to at least a portion of the plurality of storage devices of the second storage tier; and
    to process input-output requests from one or more host devices associated with the virtual storage volume, wherein the processing comprises moving data between the first portion and the second portion of the virtual storage volume, based at least in part on two or more lists related to data movement operations between the first portion and the second portion, so that each of the input-output requests is processed using the first portion of the virtual storage volume, and wherein the two or more lists are maintained on the first portion of the virtual storage volume and comprise a first list comprising pointers to items of data stored on the first portion that are most recently used and a second list comprising pointers to items of data stored on the first portion that are most frequently used.

17. The apparatus of claim 16, wherein the storage devices of the first storage tier provide at least one of: a higher throughput and a faster response time relative to the storage devices of the second storage tier.

18. The apparatus of claim 17, wherein at least one of:
    the storage devices on the first storage tier comprise one or more non-volatile memory express drive devices, and
    the storage devices on the second storage tier comprise one or more hard disk drive devices.

19. The apparatus of claim 16, wherein the two or more lists further comprise a third list comprising pointers to items of data that have been moved from the first portion to the second portion of the virtual storage volume.

20. The apparatus of claim 19, wherein a given one of the input-output requests comprises a read request, and wherein the processing comprises:

in response to determining that the first portion of the virtual storage volume does not comprise data associated with the read request, searching at least one of: the first, second, and third lists to identify a location of the data associated with the read request;

moving the requested data to the first portion of the virtual storage volume; and providing a response to the read request.

\* \* \* \* \*